United States Patent [19]

Tamamura

[11] Patent Number: 4,666,275

[45] Date of Patent: May 19, 1987

[54] CAMERA

[75] Inventor: Hideo Tamamura, Tokyo, Japan

[73] Assignee: Canon Kabushiki Kaisha, Tokyo, Japan

[21] Appl. No.: 743,424

[22] Filed: Jun. 11, 1985

[30] Foreign Application Priority Data

Jun. 13, 1984 [JP] Japan .............................. 59-87639[U]

[51] Int. Cl.⁴ ............................................. G03B 15/03
[52] U.S. Cl. ................................................... 354/126
[58] Field of Search ............. 354/126, 202, 82, 145.1, 354/288, 410, 413, 414, 424, 434, 476

[56] References Cited

U.S. PATENT DOCUMENTS

| | | | |
|---|---|---|---|
| 2,682,603 | 6/1954 | Dine et al. | 354/145.1 X |
| 3,263,584 | 8/1966 | Knus | 354/126 |
| 3,358,573 | 12/1967 | Bihlmaier | 354/126 |
| 3,577,899 | 5/1971 | Ikegami | 354/126 |
| 3,869,604 | 3/1975 | Prochnow | 354/126 X |
| 4,319,818 | 3/1982 | Sawara | 354/145.1 |
| 4,331,405 | 5/1982 | Yamamoto | 354/126 |

Primary Examiner—Donald A. Griffin
Attorney, Agent, or Firm—Toren, McGeady and Goldberg

[57] ABSTRACT

In the disclosed camera, an arrangement shifts the light detecting location of a light sensor facility from a first position offset from the camera's optical axis to a second light detecting location offset from the axis and angularly displaced from the first position. In a specific embodiment, a mount, rotatable about an objective lens, shifts a light detector from below the lens to the side of the lens so that when the camera is turned from a horizontal to a vertical position, the light detector may still be located below the lens. Preferably, the mount also carries the flash emitter of a flash unit and a camera grip so they retain their positions when the camera is turned. Effectively, the light detector, the flash emitter, and the grip remain in position while the camera body is turned.

22 Claims, 9 Drawing Figures

CAMERA

BACKGROUND OF THE INVENTION

Field of the Invention

This invention relates to cameras and particularly to cameras whose light measuring system includes a light detector offset from the lens axis to detect light from an uncentered object of interest.

Conventional lens-shutter cameras with shutters between lens elements often utilize light measuring systems with light detectors positioned below the lens when the camera is held horizontally. This aims the light detector towards points of interest just below the lens axis. It accommodates the camera for the majority of situations where the main object is just below the center of the overall photographic field when the camera is held horizontally to produce a horizontal image field. However, turning the camera vertically to achieve a vertical image field moves the light detector to the side of the lens axis and not only defeats the purpose of the downward offset but distorts the overall measurement. Thus, light measuring systems in cameras of this type are subject to severe limitations.

Moreover, flash units associated with such cameras are also offset from the lens axis. Turning the camera vertically shifts the flash from a desired predetermined location above the lens to what may be a less suitable place. This may not only affect the illumination adversely but may further result in inappropriate emphasis during light measurement.

An object of the invention is to improve cameras.

Another object of the invention is to overcome the aforementioned disadvantages.

SUMMARY OF THE INVENTION

According to a feature of the invention, these and other objects are attained in whole or in part by varying the light detecting location from a first detecting position offset from an axis, along which light from the lens travels, to a second offset detecting position. According to another feature of the invention this is done by mounting the light detector on a mount that is arcuately (i.e. angularly) movable about the axis along which light travels through the lens.

According to another feature of the invention, the mount is movable about the axis from a position corresponding to a point below the center of the field being photographed when the camera is horizontal to a similar position when the camera is held vertically.

According to yet another feature of the invention, the mount also carries the camera's flash unit to maintain the original angular alignment of the flash unit to the lens axis and the light detector when the camera is rotated between horizontal and vertical orientations.

According to still another feature of the invention, the mount carries the camera's grip.

These and other features of the invention are pointed out in the claims. Other objects and advantages of the invention are set forth in the following detailed description when read in light of the accompanying drawings.

DETAILED DESCRIPTION OF PREFERRED EMBODIMENTS

Figure 1:
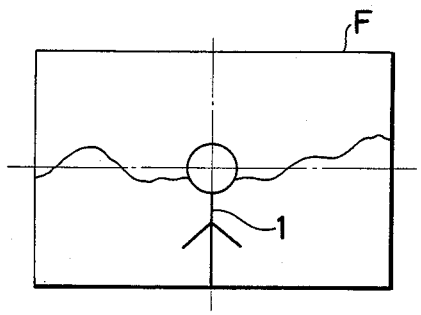
FIG. 1 is an illustration showing the position of a main object within a photographic field or frame when the camera is held horizontally.
Figure 2:
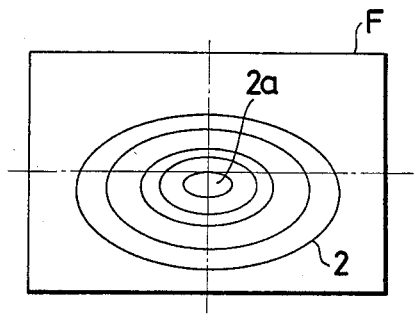
FIG. 2 is an illustration of the sensitivity distribution of a light measuring photo-sensitive element when the camera is held horizontally.

In FIG. 1, a conventional camera's photographic field F includes a main object 1 slightly below the field's center. Conventional so-called lens-shutter cameras generally carry a light measuring photosensitive element, a light emitting section (or flash emitter) of a flash unit, and other members, at fixed positions suitable for photographing scenes with a horizontally held camera. In other words, in the majority of cases the photographer holds the camera to place the main object 1 in the scene a little below the center of the view field or photographic field, and hence, a little below the center of the ultimate photographic image. Therefore the light detector or photosensitive element of the camera's light measuring system is positioned below the optical axis of the camera's photo-taking lens when the camera is horizontal. As shown in FIG. 2, the center 2a of the sensitivity distribution 2 of the photosensitive element is located below the center of the photographic field F for apposite light measurement centered on the main object 1.

Holding such a camera vertically turns the sensitivity distribution 2, shown in FIG. 2, 90 degrees and displaces its center 2a upward and sideways. This prevents a measurement appropriate to the main object.

During flash photography, the flash preferably illuminates the main object from above. Accordingly, the flash unit's flash emitter should be disposed in or on the upper part of the camera. Accordingly, the flash emitter is generally arranged in or on the upper part of the camera when the camera is held horizontally. Holding the camera vertically, lowers flash emitter to a lower part of the camera and prevents a suitable flash.

Figure 3:
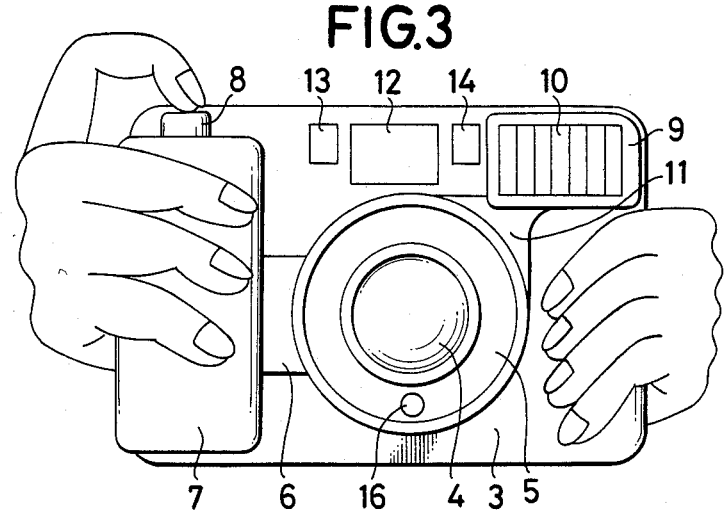
FIG. 3 is a front view showing a camera embodying this invention when held horizontally.
Figure 4:
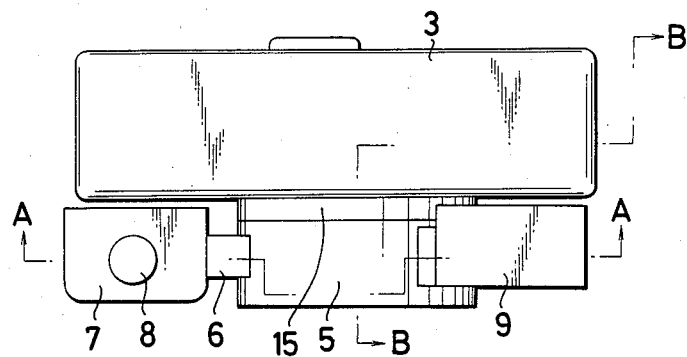
FIG. 4 is a plan view showing the upper surface of the camera of FIG. 3.

FIG. 3 is a front view of a horizontally held camera embodying the invention and FIG. 4 is a plan view showing the upper surface of the camera of FIG. 3. These illustrations include a camera body 3 and a photo-taking lens 4. A rotating ring 5 is rotatable around the axis of the photo-taking lens 4. A hollow grip arm 6 is secured to and rotatable with the rotating ring 5. The grip arm 6 carries a grip 7, which forms a battery housing chamber and includes a release button 8. The grip 7 is turnable with the grip arm 6. Thus, the turnable arrangement of the grip 7 on the grip arm 6 and the ring 5 allows the right hand of the photographer to keep a firm hold on the camera irrespective of whether the camera is vertically or horizontally oriented. A flash case 9 and a flash protector or window 10 mounted on the case to cover the front surface of the case form of the flash unit's flash emitter.

A hollow flash arm 11 secures the case 9 to the rotating ring 5. The case 9 is thus turnable with the rotating ring 5 so as always to locate the flash emitter in an upper part of the camera whether or not the camera is vertical or horizontal. Therefore, the flash can always illuminate a main object to be photographed from above.

The camera also includes a view finder 12, distance measurement windows 13 and 14 for an automatic focus detecting device which is not shown, and a fixed lens barrel 15 which carries the photo-taking lens.

Figure 5:
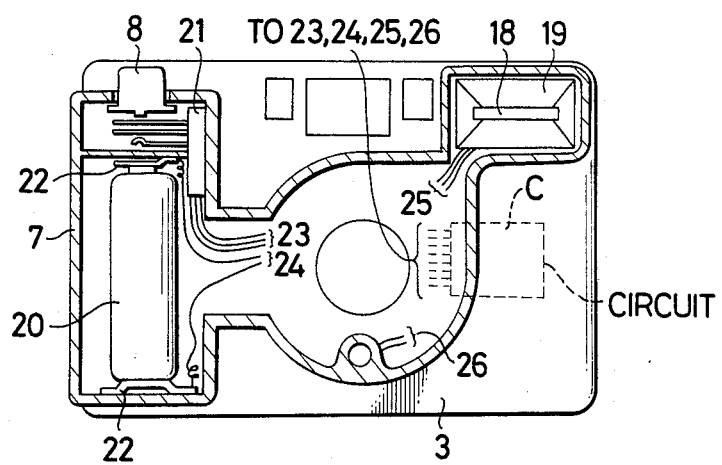
FIG. 5 is a sectional view taken along line A—A of FIG. 4.
Figure 6:
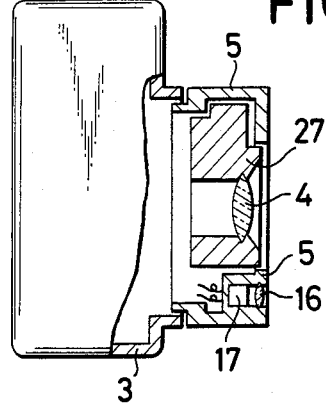
FIG. 6 is a sectional view taken along line B—B of FIG. 4.

FIG. 5 is a sectional view taken along line A—A of FIG. 4. FIG. 6 is a sectional view taken along B—B of FIG. 4. In FIG. 6, a light receiving window 16, which is also shown in FIG. 3 and serves the purpose of light measurement, is arranged in the rotating ring 5. A light measuring photosensitive element 17 within the light receiving window 16 measures the luminance of an object to be photographed. The light receiving window 16 and the light measuring photosensitive element 17 are secured to the rotating ring 5 and are revolvable around the axis of the photo-taking lens 4 with the rotating ring 5.

In use, the light receiving window 16 and the light measuring photosensitive element 17 are arranged always to be below the optical axis of the photo-taking lens 4 whether the camera is held vertically or horizontally. The structure is such that the center of sensitivity distribution of the light measuring photosensitive element 17 always coincides with the expected position of a main object within a photographic field irrespective of the manner in which the camera may be held to photograph scene. This facilitates a consistently accurate light measurement. As mentioned, in addition to the receiving window 16 and the light measuring photosensitive element 17, the rotating ring 5 also carries grip 7 and the flash case 9. The grip 7, case 9, window 16, and element 17 all turn together about the axis of the lens 4, and are arranged automatically to be set in appropriate positions when any one of them is correctly set.

In FIGS. 5 and 6, a xenon tube 18 and a reflector 19 form parts of the flash emitter within the flash case 9. A battery 20 is placed within the grip part 7. A release contact member 21 closes in response to an operator's depressing the release button 8, and thereby actuates a photo-taking circuit C which is shown schematically. The release contact member 21, a battery contact member 22, the xenon tube 18, and light measuring photosensitive element 17 are connected by connectors 23, 24, 25, and 26 to schematically-shown circuit C within the camera. These connectors 23, 24, 25, and 26 connect to the internal parts of the camera through the grip arm 6, the flash arm 11 and the rotating ring 5. The connectors are sufficiently long to allow the rotating ring 5 to rotate without stretching the connectors tightly.

A movable lens barrel 27 carries the photo-taking lens 4 in the barrel's center opening. When the camera is held horizontally to form the photographic field shown in FIG. 1, namely, held in the manner adopted in most cases, the center of the light measuring position of the light measuring photosensitive element 17 rests beneath the optical axis of the photo-taking lens 4. The center of the sensitivity distribution then lies beneath the center of the photographic field F, as shown in FIG. 2. Accordingly, as shown in FIG. 1, the center of the sensitivity distribution of the light measuring photosensitive element 17 coincides with the point at which a photographer generally places the main object 1 within the photographic field. This permits a light measurement apposite to the main object. At the same time, the flash emitter with its protector 10 is located on the upper right side of the camera. During flash photography, the flash emitter's light emitting tube 18 disposed inside the protector 10 is in a position to illuminate the scene with the flash coming from above the main object 1, thereby facilitating an adequate flash operation. Further, the grip 7 is located vertically on the left side of the camera to enable the right hand of the photographer to keep a firm and correct hold on the camera.

Figure 7:
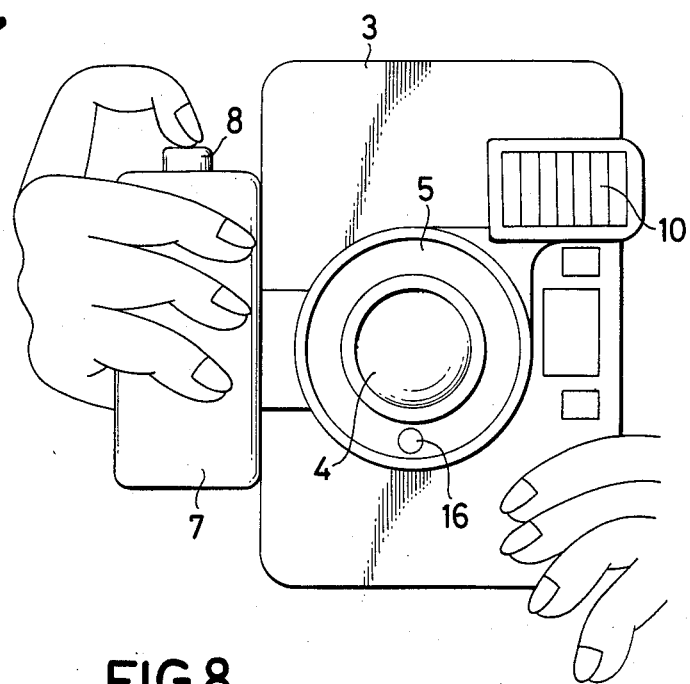
FIG. 7 is a front view showing the camera of FIG. 3 held vertically.
Figure 8:
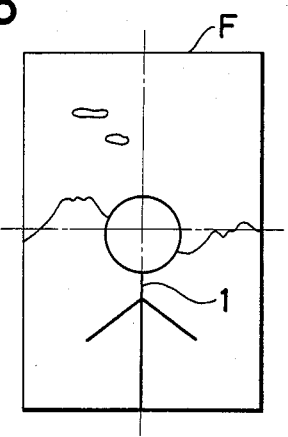
FIG. 8 is an illustration of the position of the main object within a photographic field with the camera held as shown in FIG. 7.
Figure 9:
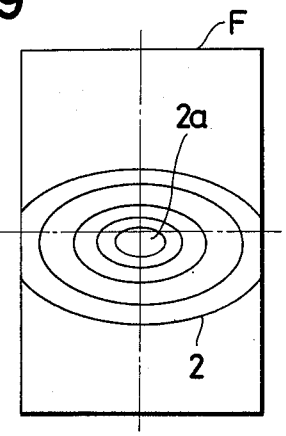
FIG. 9 is an illustration of the sensitivity distribution of a light measuring photo-sensitive element within a photographic field with the camera held as shown in FIG. 7.

When the camera is to be held vertically as shown in FIG. 7, the rotating ring 5 is turned 90 degrees counterclockwise relative to the camera body 3. This again brings the light measuring photosensitive element 17 to a light measuring position below the optical axis of the photo-taking lens 4. As shown in FIG. 9, the center of the sensitivity distribution of the light receiving photosensitive element 17 is then again set at a point corresponding to that at which the main object 1 is generally placed, namely, below the center of a photographic field F as shown in FIG. 8. The arrangement permits a light measurement apposite to the main object 1. Rotation of the ring 5 to this position also places the flash protector 10 at an upper right-hand portion of the camera body, and enables taking a suitable top-lighted flash photograph in the same manner as in the horizontal orientation of the camera. The turned ring 5 further puts the grip 7 at the upper left-hand of the camera body 3 to permit a firm hold on the camera body 3.

In accordance with this invention, and as described in the foregoing, the camera's light measuring position adjusting device is capable of shifting the light measuring position of the light measuring photosensitive element 17 to a light measuring position that is always beneath the photo-taking lens 4 irrespective of whether the camera is held vertically or longitudinally. The sensitivity of the light measuring photosensitive element 17 is thus adjusted to the main object which in general is located below the center of the photographic field irrespective of the camera's orientation. The invention imparts great advantageous flexibility to the camera.

The arrangement always displaces the flash emitter portion of the flash unit i.e., the flash unit's case 9, tube 18, reflector 19, and window 10, toward the top of the camera and the grip to the side of the camera body suited for holding the camera. This occurs irrespective of the camera's holding position, so as to enhance the functionality and operability of the camera.

The advantage of the invention is particularly salient with a half-size camera which uses a vertically advancing roll of film, because such a camera must be held vertically to take a normal horizontally oblong picture.

The invention furnishes a camera with a light measuring position adjustment which varies the light measuring position of light measurements so as always to place the light measuring position below a photo-taking lens irrespective of whether the camera is held horizontally or vertically. It affords a consistently adequate light measurement.

While the embodiments of the invention have been described in detail, it will be evident that the invention may be embodied otherwise without departing from the spirit and scope of the invention.

For example, the invention may also be practiced electronically. For example, two light receiving elements 17 may be placed in two windows 16, one in the position shown in FIG. 3, and the second 90 degrees counter-clockwise from the position shown in FIG. 3. When the camera is held horizontally as in FIG. 3, a suitable shift switch can connect the light sensitive element 17 in the window 16 to the camera circuitry C, and in the vertical position, the switch can connect the other photosensitive element to the interior light measuring circuitry of the camera. The shift switch may be actuated manually or inertially.

The invention may also be practiced with a single lens reflex camera using a through-the-lens measuring system. The mounting ring 5, as well as the arms 6 and 11, and flash case 9 and 7, would be the same as in FIGS. 3 to 7. However, the photosensitive element would be shifted within the camera body by means of a lever or gear arrangement. Alternatively, two photosensitive elements can be placed inside the single lens reflex camera body, and suitable switches actuated by turning of the mounting ring 5. Alternatively, a separate manual switch, or inertial switch, connects the correct photosensitive elements into the light measuring circuitry.

What is claimed is:

1. A camera comprising:
   a camera body defining a light path having a phtographic optical axis;
   light detecting means for detecting light striking the light detecting means; and
   varying means for establishing, for said light detecting means, a first light detecting location axially offset from the photographic optical axis, and a second light detecting location offset from the photographic optical axis and angularly spaced about the photographic optical axis from the first light detecting location, wherein the varying means establishes the first light detecting location below the photographic optical axis when the camera body is held horizontally with the photographic optical axis horizontal, and establishes the second light detecting location also below the photographic optical axis when the camera body is held vertically with the photographic optical axis horizontal.

2. A camera as in claim 1, wherein the light detecting means includes a light detecting portion, and said varying means includes a mount for holding said light detecting portion and for moving said light detecting portion from one of said first and second light detecting locations to the other.

3. A camera as in claim 2, further comprising a flash unit having a flash emitter, said flash emitter being mounted on said mount for movement with said light detecting portin from a first flash position above the photographic optical axis when the photographic optical axis is horizontal and the body is horizontal, to a secodd flash position also above the photographic optical axis when the photographic optical axis is horizontal and the body is vertical.

4. A camera as in claim 3, further comprising a grip mounted on said mount for movement with the light detecting portion from a first grip position on one side of the photographic optical axis when the body is horizontal, to a second grip position on the same side of the photographic optical axis when the body is turned vertically.

5. A camera as in claim 4, wherein said mount is hollow and said light detecting means further includes connectors passing from said body to said light detecting portion through the mount.

6. A camera as in claim 5, wherein said mount is hollow, said flash unit includes a flash tube in said emitter and flash connectors, and said flash connectors pass through said mount from said body to sdid flash emitter.

7. A camera as in claim 6, when said mount is hollow, said grip includes battery circuitry and connectors, and said connectors pass through said mount from said battery circuitry to said body.

8. A camera as in claim 7, wherein said hollow mount includes a hollow ring and a plurality of hollow arms extending from the ring for holding said light detecting portion, said flash emitter and said grip, and said connectors pass through said hollow arms.

9. A camera as in claim 3, wherein said mount is hollow and said light detecting means further includes connectors passing from said body to said light detecting portion through the mount.

10. A camera as in claim 9, wherein said mount is hollow, said flash unit includes a flash tube in said emitter and flash connectors, and said flash connector pass through said mount from said body to said flash emitter.

11. A camera as in claim 10, when said mount is hollow, said grip includes battery circuitry and connectors, and said connectors pass through said mount from said battery circuitry to said body.

12. A camera as in claim 3, wherein said mount is hollow, said flash unit includes a flash tube in said emitter and flash connectors, and said flash connector pass through said mount from said body to said flash emitter.

13. A camera as in claim 12, when said mount is hollow, said grip includes battery circuitry and connectors, and said connectors pass through said mount from said battery circuitry to said body.

14. A camera as in claim 2, further comprising a grip mounted on said mount for movement with the light detecting portion from a first grip position on one side of the photographic optical axis when the body is horizontal, to a second grip position on the same side of the photographic optical axis when the body is turned vertically.

15. A camera as in claim 14, wherein said mount is hollow and said light detecting means further includes connectors passing from said body to said light detecting portion through the mount.

16. A camera as in claim 15, wherein said mount is hollow, said flash unit includes a flash tube in said emitter and flash connectors, and said flash connector pass through said mount from said body to said flash emitter.

17. A camera as in claim 16, when said mount is hollow, said grip includes battery circuitry and connectors, and said connectors pass through said mount from said battery circuitry to said body.

18. A camera as in claim 14, when said mount is hollow, said grip includes battery circuitry and connectors, and said connectors pass through said mount from said battery circuitry to said body.

19. A camera as in claim 2, wherein said mount is hollow and said light detecting means further includes connectors passing from said body to said light detecting portion through the mount.

20. A camera comprising:
   (a) a photo-taking optical system;
   (b) a shifting member capable of turning a camera body around said photo-taking optical system; and (c) an attachment to said camera body arranged to be mounted on said shifting member, said attachment being arranged to have the original position thereof retained by said shifting member when said camera body is turned around said photo-taking optical system, wherein said attachment includes a photosensitive portion arranged to be allowed by said shifting member to be continuously in a position to receive light at a point below said photo-taking optical system.

21. A camera comprising:
(a) a photo-taking optical system;
(b) a shifting member capable of turning a camera body around said photo-taking optical system; and
(c) an attachment to said camera body arranged to be mounted on said shifting member, said attachment being arranged to have the original position thereof retained by said shifting member when said camera body is turned around said photo-taking optical system, wherein said shifting member is provided with a hollow part; and said attachment includes a photosensitive portion which is allowed to have electrical connection through said hollow part.

22. A camera comprising:
(a) a photo-taking optical system;
(b) a shifting member capable of turning a camera body around said photo-taking optical system; and
(c) an attachment to said camera body arranged to be mounted on said shifting member, said attachment being arranged to have the original position thereof retained by said shifting member when said camera body is turned around said photo-taking optical system, wherein said shifting member is provided with a hollow part; said attachment includes a grip part for holding said camera, a power supply circuit being arranged within said grip part; and electrical connection with said power supply circuit is effected through said hollow part.

* * * * *